Feb. 23, 1971    A. J. DE MARIA    3,566,303
ULTRASONIC CONTROL SYSTEM FOR LASERS
Original Filed Oct. 8, 1962    2 Sheets-Sheet 1

INVENTOR
ANTHONY J. DeMARIA
BY David S. Fishman
ATTORNEY

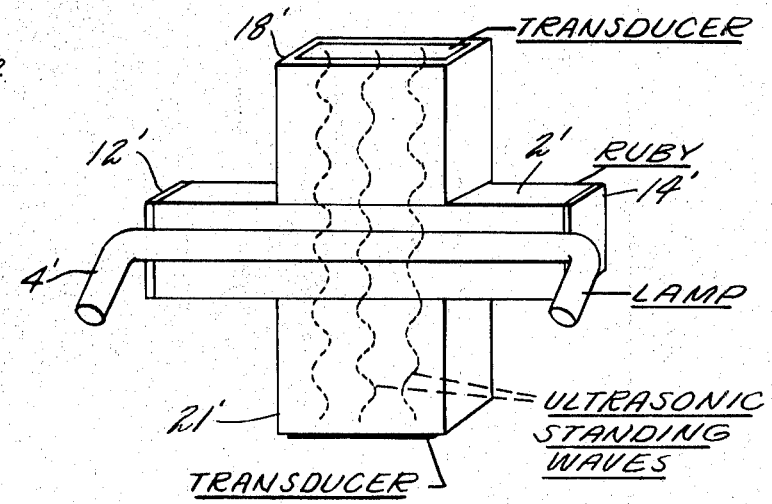
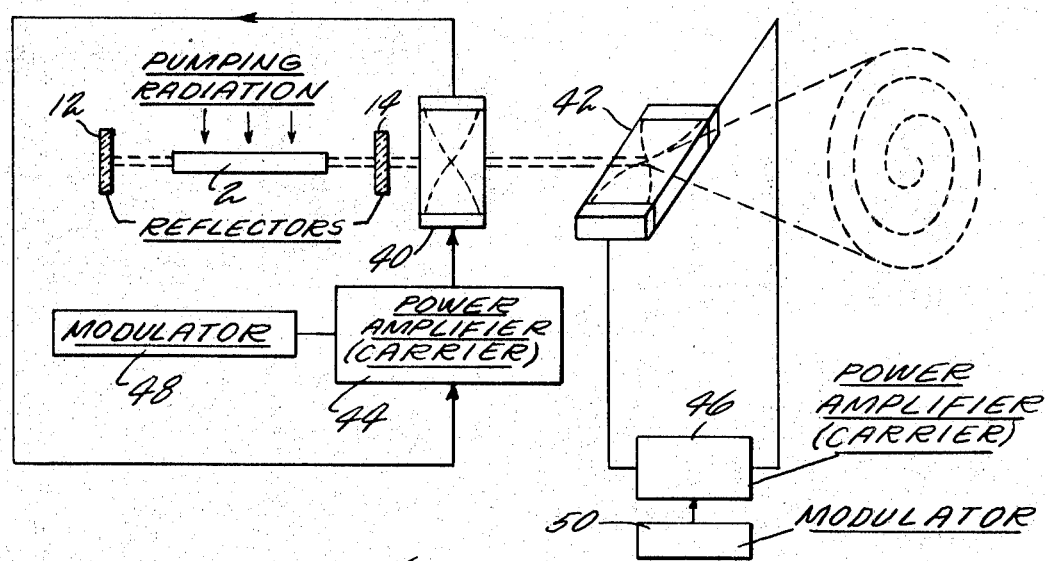
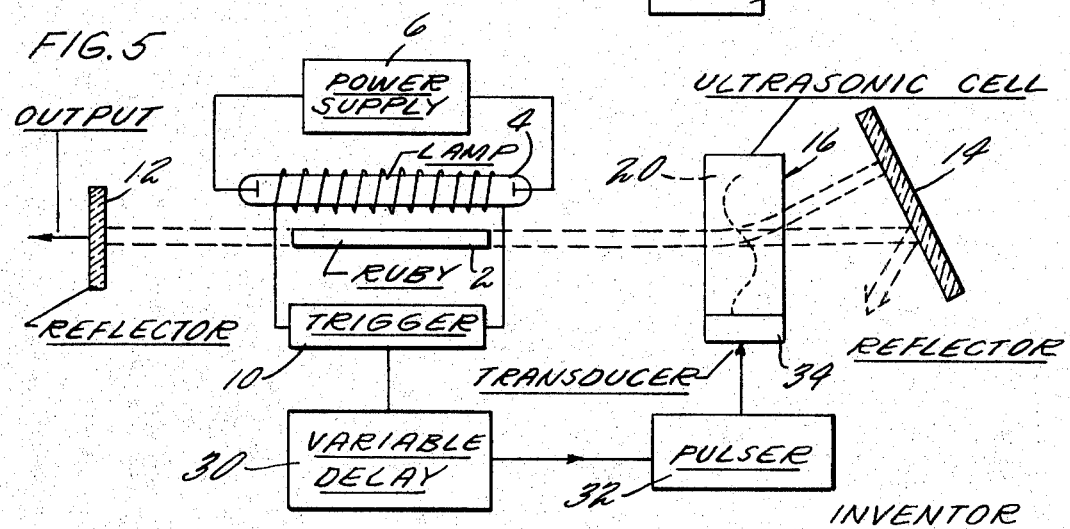

United States Patent Office
3,566,303
Patented Feb. 23, 1971

3,566,303
ULTRASONIC CONTROL SYSTEM FOR LASERS
Anthony J. De Maria, West Hartford, Conn., assignor to United Aircraft Corporation, East Hartford, Conn., a corporation of Delaware
Continuation of application Ser. No. 228,969, Oct. 8, 1962. This application June 15, 1967, Ser. No. 653,289
The portion of the term of the patent subsequent to Jan. 10, 1984, has been disclaimed
Int. Cl. G02f 1/28; H01s 3/00
U.S. Cl. 331—94.5
15 Claims

ABSTRACT OF THE DISCLOSURE

A control system for lasers in which the refractive index of the medium through which the laser electromagnetic energy propagates is varied by positioning therein an ultrasonic cell through which an acoustic wave is generated. Either refraction or diffraction of the laser radiation occurs as a function of the acoustic wave-length. The cell may be positioned in the laser feedback cavity.

CROSS-REFERENCES TO RELATED APPLICATIONS

This application is a continuation of application Ser. No. 228,969 filed Oct. 8, 1962.

BACKGROUND OF THE INVENTION

This invention relates to infrared masers, optical masers, and ultraviolet masers, all of which will be referred to hereinafter as lasers. More particularly, this invention relates to the ultrasonic control of the output radiation from these laser devices.

For a more complete discussion of the physical phenomena by which stimulated emission of radiation can be made to occur, reference may be had to U.S. Pat. No. 2,929,922 issued to Schawlow et al. on Mar. 22, 1960. As defined in the Schawlow et al. patent and as used throughout this application, the word light refers to radiation having wave lengths in the infrared, visible and ultraviolet regions of the electromagnetic wave spectrum.

This invention involves the control of laser action by obtaining a time varying refractive index in the Fabry-Perot optical cavity. One way of obtaining this time varying refractive index is by inserting an ultrasonic cell between the reflective end plates of the laser and propagating ultrasonic energy through the cell. Depending on the relation between the width of the electromagnetic radiation beam in the optical cavity of the laser and the wave length of the sound wave passing through the ultrasonic cell, either refraction or diffraction occurs, refraction occurring when the width of the electromagnetic radiation beam W is much narrower than the sound wave $\lambda^*$ and diffraction occurring when the width of the electromagnetic radiation beam W is much larger than the wave length of the ultrasonic wave. Through the teachings of the present invention, depending upon the relationship between the width of the electromagnetic radiation beam in the optical cavity of the laser and the wave length of the sound wave in the ultrasonic cell; and also depending on the position of the laser reflectors, the laser output can be controlled to eliminate the random output of some lasers to synchronize laser output with the ultrasonic frequency, to amplitude modulate the output of some lasers, large power pulses can be obtained from the laser, or the laser output can be used for scanning purposes.

Accordingly, one feature of the present invention is a novel control system for lasers in which laser output is modulated and controlled ultrasonically.

Another feature of this invention is a novel control system for lasers in which laser output is controlled by the refraction of electromagnetic radiation in the optical cavity of the laser through the use of a time varying refractive index in the feedback path of the laser.

Another feature of the present invention is a novel control for lasers in which laser output is synchronized with the frequency of an ultrasonic wave.

Still another feature of the present invention is a novel control for lasers in which laser output is shuttered either by ultrasonic diffraction interaction or ultrasonic refraction interaction to produce an extremely large amplitude output pulse from the laser.

Still another feature of the present invention is a novel laser control system in which an extremely large amplitude output pulse is achieved through the use of a reflecting surface positioned at an acute angle to the axis of the laser and with an ultrasonic cell for refracting the electromagnetic radiation in the optical cavity of the laser.

Still another feature of the present invention is a novel control system for lasers in which ultrasonic cells are used to deflect the laser output to produce a scanning system.

Still another feature of the present invention is a novel laser system in which laser output is ultrasonically gated to align, control or measure the parallelism of two flat plates.

Still another feature of the present invention is a novel laser control system in which the output of a continuous wave laser can be gated or amplitude modulated by an ultrasonic wave whereby pulse repetition rate is determined by optical pumping intensity and ultrasonic frequency.

Other features and advantages will be apparent from the specification and claims, and from the accompanying drawings which illustrate an embodiment of the invention.

BRIEF DESCRIPTION OF THE DRAWING

FIG. 4 is a variation of the structure of FIG. 1 wherein the ultrasonic energy is passed directly through the active laser element.

FIG. 5 is a showing of an ultrasonic control system for lasers in which one or more large output pulses are generated.

FIG. 6 is a showing of an ultrasonic control system for lasers in which the laser beam can be scanned in a variety of patterns.

DESCRIPTION OF THE PREFERRED EMBODIMENT

Except where otherwise indicated, the following discussion will describe the present invention as used with a ruby laser and a liquid medium ultrasonic cell. However, it is to be expressly understood that any type of laser and any ultrasonic cell either liquid, gas, or solid can be used in the practice of the present invention, or the ultrasonic wave can be propagated through the active portion of the laser system.

Figure 1:
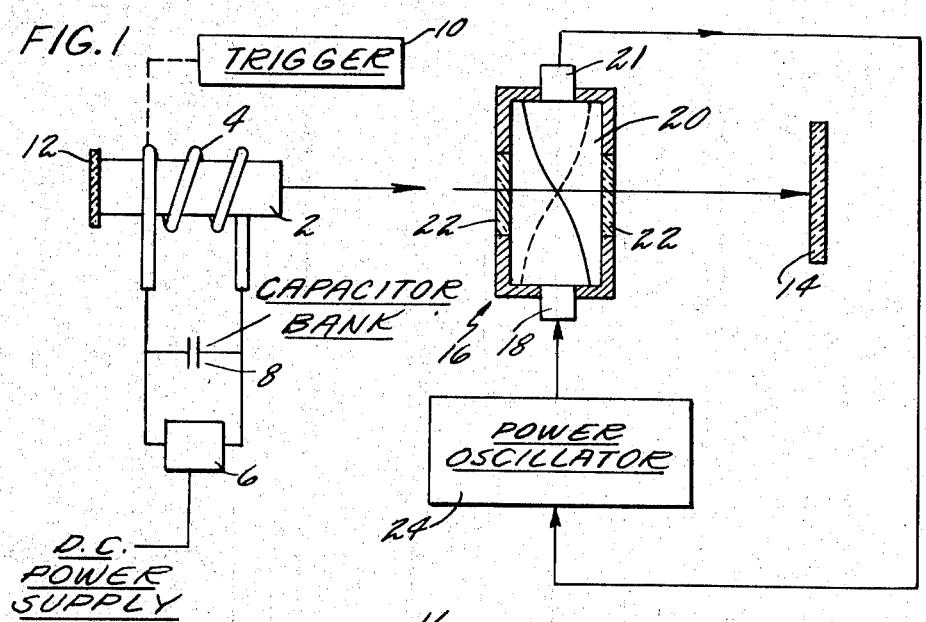
FIG. 1 is a showing of the control system of the present invention in which an ultrasonic cell is interposed between the laser and a reflecting surface to generate a gated output from the laser.

Referring now to FIG. 1, a ruby laser 2 is shown with a pumping lamp 4 which has a DC power supply 6 and a capacitor bank 8 connected thereto, and a triggering circuit 10 is provided for lamp 4. The lamp 4 and its lighting circuitry are conventional laser pumping apparatus and form no part of the present invention. Laser 2 is a standard ruby laser except that only one end has the usual reflective coating or mirror 12 while the other end is uncoated and the mirror usually present at the now uncoated end is moved outboard as at 14 parallel to mirror 12 and in alignment with the axis of the laser and facing the uncoated end, mirror 14 preferably being more reflective than mirror 12. An ultrasonic cell 16 is interposed between the uncoated end of the laser and mirror 14 so that cell 16 is in the optical cavity of the laser. Cell 16 has a $BaTiO_3$ transducer 18, an alcohol medium 20 and a $BaTiO_3$ receiver 21. Cell 16 also has transparent windows 22 to allow passage of the beam of coherent light generated by the laser therethrough. Transducer 18 is driven by oscillator 24 to generate an ultrasonic frequency wave in medium 20, and the output from receiver 21 is fed back to oscillator 24 to supply positive feedback for the oscillator. Cell 16 is excited concomitantly with the pumping of ruby 2. Cell 16 could be a traveling wave cell as well as the standing wave cell described.

Figure 2:
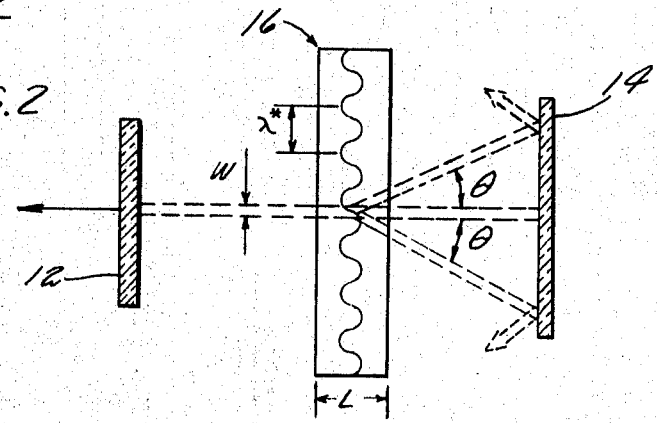
FIG. 2 is a showing of a part of FIG. 1 in which the ultrasonic refraction of the electromagnetic radiation beam in the optical cavity of the laser is illustrated.
Figure 3:
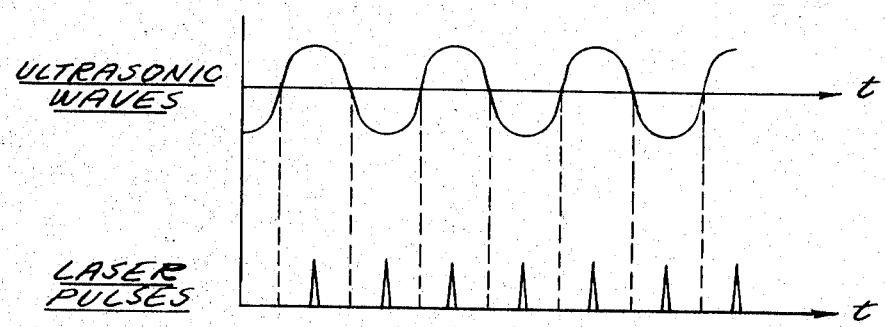
FIG. 3 is a showing of the coordination and synchronization between the ultrasonic wave and the laser pulses of the structure of FIG. 1.
Figure 1A:
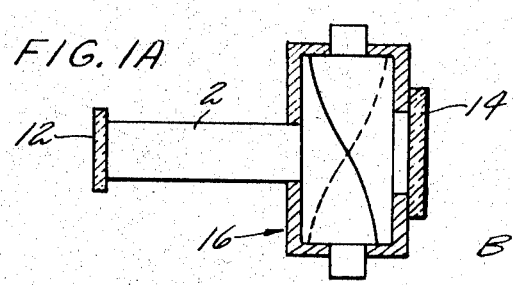
FIG. 1a is a showing of alternative structure of FIG. 1 wherein the laser, the ultrasonic cell, and the outboard mirror are abutted.

In the configuration of FIG. 1 the elements are selected so that the width W of the electromagnetic radiation beam in the optical cavity of laser 2 is much narrower than the wave length $\lambda^*$ of the sound wave in the ultrasonic cell, the ratio $W/\lambda^*$ being approximately 1/4 or less. With W much less than $\lambda^*$ the electromagnetic radiation beam in the optical cavity of laser 2 passing through the ultrasonic field in cell 16 will be refracted back and forth in a sinusoidal manner with the deflection angle $\theta$ being given by the expression:

$$\sin \theta = \frac{2\pi \Delta \mu L}{\lambda^*} \cos 2\pi f^* t \qquad (1)$$

where $\Delta \mu$ is the maximum change of the refractive index of the cell medium caused by the ultrasound, L is the path length of the light through the sound field, $f^*$ is the ultrasonic frequency, and $t$ is time. Referring to FIG. 2, which is a simplified schematic of FIG. 1 and in which like elements are numbered as in FIG. 1, the refraction of the electromagnetic radiation beam is illustrated. Thus, when laser 2 is pumped, an emitted beam is passed through the ultrasonic field and is caused to scan mirror 14. When the angle $\theta$ is large the beam reflected from mirror 14 is directed away from laser 2 and the energy loss will prevent laser action from taking place at these angles. However, when $\theta$ is zero or nearly zero the energy incident on mirror 14 is reflected or fed back to laser 2 and laser action will occur. The angle $\theta$ will be zero twice in each cycle of the sound wave, and hence laser action will take place with a pulse repetition frequency of $2f^*$, and this relationship is shown in FIG. 3. In addition, as shown in FIG. 1a, the elements of the system can be brought together to reduce losses. Thus, cell 16 is butted against the uncoated end of ruby rod 2 and mirror 14 is butted against cell 16. In this configuration it would be desirable to choose the cell medium such that it matches the index of refraction of the active laser material. Only a few watts of ultrasonic power are needed for this ultrasonic feedback modulation technique. For example, a 5 cm. long, 0.6 cm. diameter ruby was operated as in FIG. 1 with a pumping energy of 3360 joules. The ultrasonic cell was excited at 122 kc. with less than 10 watts applied to transducer 18, and a series of evenly spaced laser outputs at $2f^*$ was obtained.

Thus it can be seen that laser action can be coordinated and synchronized with ultrasonic frequency to produce an ultrasonic feedback modulation of electromagnetic radiation in the optical cavity of a laser whereby evenly spaced laser pulses are realized rather than the usual random output pulses of some laser. Also, by the foregoing technique, a continuous wave output can be gated or amplitude modulated. In addition, an increase in pulse height, a decrease in pulse width, and a sharpening of pulse rise time are realized through this ultrasonic feedback modulation technique, and there are no moving parts in the system.

It has been stated above that laser action with the ultrasonic feedback modulation of FIG. 1 will occur at the rate of $2f^*$; however, this has presupposed that the ultrasonic frequency is low enough to allow sufficient time for the E energy level population to reach the threshold value every half cycle of the ultrasonic sound wave. If the pumping intensity is not sufficient for the E population level to reach threshold every half cycle of the ultrasonic sound wave, laser action will occur once every full cycle of the sound wave. Thus, it will be understood that the frequency of laser action can be made to vary from $2f^*$ to $1/Nf^*$, where N=1, 2, 3 . . . by regulating the intensity of the pumping of the laser.

The generation of a series of sharp, evenly spaced laser pulses through ultrasonic feedback modulation of laser output as described above can find application in a variety of purposes, including, but not limited to, radar, range determination, and communication.

The above described ultrasonic gating of the output of ruby 2 can also be achieved with mirror 14 deviated from parallelism with mirror 12, i.e., at an acute angle to the axis of ruby 2. Positioning mirror 14 in this manner forces the gating action of ruby 2 to occur at the ultrasonic frequency $f^*$ over a large range of optical pumping intensities and firmly establishes a fixed phase relationship between the ultrasonic frequency and the laser oscillations. Measurements have shown that a 6 minute off parallelism between mirrors 12 and 14 results in a 90° displacement of the laser spikes with respect to the ultrasonic wave form.

Referring now to FIG. 4, wherein parts similar to FIG. 1 are numbered as in FIG. 1 with a prime (′) superscript, a configuration is shown wherein both ends 12′ and 14′ of the ruby 2′ are reflectively coated. Ultrasonic waves are generated by transducer 18′ and passed through the ruby 2′ to receiver 21′. Pumping light is supplied by lamp 4′. The configuration shown in FIG. 4 produces an output of evenly spaced laser pulses in the same manner as the structure of FIG. 1. In the structure of FIG. 4 the refraction of the electromagnetic radiation beam occurs internally of the ruby 2′, and the electromagnetic radiation beam scans mirror 14′ and is periodically reflected to produce laser action as described above. Of course, a travelling wave could also be passed through ruby 2′.

Referring now to FIG. 5, a configuration is shown whereby an ultrasonically gated giant pulse is obtained from a ruby laser. The structure is quite similar to that of FIG. 1, and like elements are numbered as in FIG. 1. The output from the trigger 10 is passed through a variable delay 30 and thence to a pulse generator 32, the output from pulse generator 32 trailing the initiation of pumping light by a predetermined time. Pulser 32 rings a transducer 34 in ultrasonic cell 16 which drives alcohol medium 20. Mirror 12 is shown removed from the end of ruby 2, but could just as well be as in FIG. 1. The significant differences in the FIG. 5 configuration from that of FIG. 1 is that mirror 14 is deviated from parallelism with mirror 12, i.e., mirror 14 forms an acute angle with the axis of ruby rod 2 and there is a deliberate delay between initiation of pumping of ruby 2 and excitation of cell 16.

In the operation of the structure of FIG. 5, the pumping of ruby 2 is initiated prior to the excitation of ultrasonic cell 16 due to delay 30. The deviation from parallelism of mirror 14 is such that for a given amount of pumping enough of the spontaneous fluorescence from ruby 2 is deflected away from the ruby rather than returned to it so that lasing of the ruby is prevented. In essence, the optical feedback path to the ruby has been blocked, i.e., a high value for the threshold energy of the laser is created, the device will not oscillate, and a large overpopulation of excited atoms results. Variable delay 30 is set to actuate pulser 30 and pulse transducer 34 with a high voltage pulse to pass an ultrasonic wave through alcohol medium 20, preferably when overpopulation is at a maximum. The spontaneous radiation from ruby 2 passing through cell 16 to mirror 14 interacts with the ultrasonic wave and is refracted in accordance with Equation 1, supra, the wave length of the ultrasonic wave in cell 16 being much greater than the width of the laser beam, and a condition will occur when the radiation will be directed perpendicular to mirror 14. At this time, a high restoration of positive feedback to ruby 2 is initiated and laser action will occur with a very large burst of radiation.

Experiments with the configuration of FIG. 5 using a 5 cm. long, 0.6 cm. diameter ruby, energized at 900 joules and with a 4 $\mu$sec. pulse used to ring a 182 kc. lead zirconate titanate transducer have produced pulse heights of 50 to 75 times the normal pulse amplitudes with a rise time of less than 30 nanoseconds and with pulse widths on the order of 50 to 75 nanoseconds, in contrast with microsecond pulse widths of the random pulses.

This large output spike can find application in long range radar, range finding, and for welding and drilling operations.

The structure of FIG. 5 can be used to obtain a series of relatively large pulses by periodically exciting the ultrasonic cell during normal lasing action.

Reverting now to the structure of FIG. 1, the giant pulse described above in connection with the operation of FIG. 5 can be realized with the FIG. 1 configuration if $\lambda^*$ is selected to be much less than W, the ratio $W/\lambda^*$ being 7/1 or more. Under these conditions the beam passing through the excited ultrasonic cell is diffracted rather than refracted, and it can be shown that with sufficient ultrasonic intensity the diffraction pattern has low intensity in the center order. This effect results in higher intensity of the higher diffractory orders whose direction of propagation deviates from the axis of the ruby rod, thereby yielding a high loss to the system which is sufficient to prevent laser action. Also, diffraction of the beam destroys the coherent nature of the radiation reflected back and forth between mirrors 12 and 14 and laser action is prevented: thus, overpopulation of excited atoms occurs. Then, the ultrasonic oscillations are stopped and spontaneous radiation is reflected back to ruby 2 from mirror 14 and laser action takes place with a giant output spike.

Referring now to FIG. 6, a configuration is shown whereby the laser beam can be deflected horizontally and vertically to produce a scanning system for drilling, welding, scanning a target, etc. The structure is similar to that in FIG. 1, except that two ultrasonic cells 40 and 42 are placed downstream of mirror 12 and at right angles to each other. Cells 40 and 42 are driven by amplifiers 44 and 46, respectively, and modulators 48 and 50, which may be either frequency or amplitude modulators as desired, are connected to amplifiers 44 and 46 respectively. This system is operated in the regime where $W/\lambda^* \lesssim 1/4$, and thus the laser beam passing through ultrasonic cells 40 and 42 is deflected. Simultaneous horizontal and vertical deflection can be obtained by energizing the cells 40 and 42 with different frequencies, or spiral scanning can be obtained by driving the cells at identical frequencies and different power levels. Thus, it should be apparent that a variety of scanning patterns can be obtained by manipulating power, frequency, and phase of the driving signals to the ultrasonic cells.

Larger angles of deflection can be obtained by pressurizing the medium of the cells 40 and 42 to allow the use of high intensity ultrasonic waves without encountering cavitation.

Reverting again to the structure of FIG. 1, a measurement of the parallelism of two plates can be obtained. Experiments have shown that a 4 second deviation from parallelism between mirrors 12 and 14 results in a 1° displacement of the gated laser pulse with respect to the ultrasonic wave form. Thus, by monitoring the position of the gated laser pulses with a photo detector and simultaneously displaying the gated laser pulses and ultrasonic wave forms on a scope, the parallelism between reflective plates can be determined by observing the relative positions of the gated pulses and the ultrasonic wave forms. Of course, it will be understood that the plates whose parallelism is being measured need not be the usual reflective surfaces of the laser but could be plates displaced from the ends of the ruby and used as the reflecting surfaces.

It is to be understood that the invention is not limited to the specific embodiment herein illustrated and described but may be used in other ways without departure from its spirit as defined in the following claims.

I claim:
1. In a control system for lasers:
    means including a laser medium and an optical feedback cavity for generating a laser output,
    and means for generating an acoustic wave that produces a continuous time varying refractive index in the optical feedback cavity across the path of said laser output to control said laser output.
2. A control system for lasers as in claim 1 in which said means for generating a varying refractive index comprises means for generating an acoustic wave in the optical feedback cavity perpendicular to the path of said laser output.
3. A control system for lasers as in claim 1 in which said acoustic wave has a wave length at least 4 times the width of said laser output whereby refraction of the laser feedback is produced.
4. A control system for lasers as in claim 1 in which said acoustic wave has a wave length at least 7 times smaller than the width of said laser output whereby diffraction of said laser feedback is produced.
5. A control system for lasers as in claim 1 in which said means for generating a varying refractive index comprises an acoustic cell positioned in the optical feedback cavity, and includes means for generating an acoustic wave in said cell.
6. A control system for lasers as in claim 5 in which said acoustic wave is a traveling wave.
7. A control system for lasers as in claim 5 in which said acoustic wave is a standing wave.
8. In a control system for lasers, an active laser element, a first reflecting surface associated with one end of said laser element, a second reflecting surface in spaced relation with the other end of said laser element and out of parallelism with said first reflecting surface, and means for selectively passing a continuous time and distance varying acoustic wave through the space between said second reflecting surface and said laser element and perpendicular to the laser feedback energy to refract the laser feedback energy and generate an output from said laser.
9. In a control system for lasers:
    means including a laser medium and an optical feedback cavity for generating a laser output,
    means for ultrasonically generating a time and distance varying refractive index in said optical feedback cavity perpendicular to the laser feedback radiation and of a frequency to produce a time repetitive pulse train in said laser output.
10. A laser control system as in claim 9 in which said means for generating a refractive index variation is an acoustic cell positioned in the optical feedback cavity,
    means for generating an acoustic wave in said cell,
    and means for varying the frequency of said acoustic wave to produce a pulse train output from said laser at a repetition rate twice the frequency of said acoustic wave.
11. In a control system for lasers:
    means including a laser medium and an optical feedback cavity for generating a laser output, an acoustic cell positioned in said optical feedback cavity in the path of the laser feedback radiation, and means for generating an acoustic wave in said acoustic cell which intersects said laser feedback radiation, said acoustic wave being of a frequency to produce a diffraction pattern in the path of said feedback radiation.

12. A control system for lasers as in claim 11 and including means for varying the frequency of said acoustic wave to thereby vary the repetition rate of the laser output in response thereto.

13. In a control system for lasers:

means for generating a laser output, a first acoustic cell positioned in the path of said laser output, means for generating an acoustic wave in said first cell to generate a time and distance varying refractive index perpendicular to the direction of propagation of said laser output, a second acoustic cell positioned in the path of said laser output, means for generating an acoustic wave in said second cell to generate a time and distance varying refractive index perpendicular to the direction of propagation of said laser output and perpendicular to the direction of propagation of said first acoustic wave, and means for amplitude modulating at least one of said acoustic waves to cause a scanning of said laser output.

14. A control system for lasers as in claim 13 in which said first and second acoustic waves have a wavelength at least four times the width of said laser output to produce refraction of the laser output as it passes through said cells.

15. In a control system for lasers:

an active laser medium, a first reflecting surface associated with one end of said laser medium, a second reflecting surface in spaced relation with said laser medium, said first and second reflecting surfaces forming an optical feedback cavity including said laser medium, and means for passing a continuous time and distance varying ultrasonic acoustic wave through the space between said laser medium and said second reflecting surface to control the output from said laser.

References Cited

UNITED STATES PATENTS

| | | | |
|---|---|---|---|
| 2,155,660 | 4/1939 | Jeffree | 350—161X |
| 2,836,652 | 5/1958 | Sprague | 350—160 |
| 3,243,722 | 3/1966 | Billings | 331—94.5 |
| 3,354,404 | 11/1967 | Boyle et al. | 331—94.5 |
| 2,084,201 | 6/1937 | Karolus. | |
| 3,055,258 | 9/1962 | Hurvitz. | |
| 3,126,485 | 3/1964 | Ashkin et al. | |
| 3,247,467 | 4/1966 | Geusic et al. | |
| 3,297,876 | 1/1967 | De Maria. | |
| 3,371,265 | 2/1968 | Woodbury et al. | |
| 3,297,876 | 1/1967 | De Maria | 250—199 |

OTHER REFERENCES

Ultrasonic Control of Lasers by Cletus M. Wiley; Electronics, vol. 35, No. 40; Oct. 5, 1962.

Ultrasonic Feedback Modulation of an Optical Maser Oscillator, by A. J. De Maria and R. Gagosz; Proceedings of the IRE, vol. 50, No. 6; June 1962.

Application of Ultrasonic Standing Waves to the Generation of Optical-Beam Scanning, by Aas et al.; JOASA, vol. 36, No. 10; October 1961.

RONALD L. WIBERT, Primary Examiner

T. MAJOR, Assistant Examiner

U.S. Cl. X.R.

350—161